United States Patent [19]
Tuomey

[11] Patent Number: 5,799,686
[45] Date of Patent: Sep. 1, 1998

[54] APPARATUS FOR FASTENING COVER TO EXTERNAL FAUCETS

[76] Inventor: Scott D. Tuomey, 5012 Lovell Ave., Fort Worth, Tex. 76107

[21] Appl. No.: 846,547

[22] Filed: Apr. 30, 1997

[51] Int. Cl.$^6$ .................................................. F16K 51/00
[52] U.S. Cl. ........................... 137/375; 137/382; 24/369; 24/371
[58] Field of Search ................................... 137/375, 382; 24/369, 371

[56] References Cited

U.S. PATENT DOCUMENTS

| | | | |
|---|---|---|---|
| 2,080,728 | 5/1937 | MacNeil et al. | 220/85 R |
| 2,157,189 | 5/1939 | Schlosinger | 108/10 |
| 2,355,836 | 8/1944 | Willey | 98/116 |
| 2,686,530 | 8/1954 | Dire | 137/375 |
| 3,231,950 | 2/1966 | Lummis | 24/371 |
| 3,556,158 | 1/1971 | Schneider | 138/156 |
| 3,564,563 | 2/1971 | Trotter et al. | 24/221 |
| 3,756,450 | 9/1973 | Crose | 220/85 P |
| 3,858,632 | 1/1975 | Stout | 150/52 R |
| 3,892,397 | 7/1975 | Nicholls | 267/8 R |
| 3,973,301 | 8/1976 | Buhr | 24/239 |
| 4,071,043 | 1/1978 | Carlson | 137/375 |
| 4,103,701 | 8/1978 | Jeng | 137/375 |
| 4,142,565 | 3/1979 | Plunkett, Sr. | 150/52 |
| 4,244,394 | 1/1981 | Hartselle, III | 137/375 |
| 4,380,245 | 4/1983 | Hefner | 137/375 |
| 4,456,027 | 6/1984 | Belgard | 137/375 |
| 4,577,655 | 3/1986 | Carroll | 137/375 |
| 4,643,407 | 2/1987 | Zirk | 267/64.27 |
| 4,716,631 | 1/1988 | Gay | 24/265 B |
| 4,720,223 | 1/1988 | Neights et al. | 411/11 |
| 4,812,096 | 3/1989 | Peterson | 411/231 |
| 4,962,916 | 10/1990 | Palinkas | 267/153 |
| 5,100,272 | 3/1992 | Jadoul et al. | 411/45 |
| 5,382,124 | 1/1995 | Frattarola | 411/352 |

*Primary Examiner*—A. Michael Chambers
*Attorney, Agent, or Firm*—Geoffrey A. Mantooth

[57] ABSTRACT

The present invention is used to fasten a cover around an external faucet. The cover protects the faucet. The cover is thermally insulated and has a cavity that is structured and arranged to receive the faucet. The cover has a wall, which wall has an opening therein. The wall has a first side and a second side, with the first side being located in the cavity. There is a coupler that has an anchor and a shank. The shank is received by the wall opening and extends out therefrom. The anchor is located inside of the cavity. The anchor is structured and arranged to be coupled to the faucet. There is a stop located on the shank at a position that is outside of the cavity. A spring is located on the shank so as to be interposed between the stop and the cover wall. The spring provides resiliency between the stop and the cover wall so as to allow the coupler to be pressed in towards the faucet without moving the stop.

9 Claims, 7 Drawing Sheets

APPARATUS FOR FASTENING COVER TO EXTERNAL FAUCETS

FIELD OF THE INVENTION

The present invention relates to protective covers for external faucets, such as are found on buildings.

BACKGROUND OF THE INVENTION

Many buildings have external water faucets. For example, many homes have one or more such faucets on their exterior walls. A garden hose can be connected to such a faucet for watering purposes.

Because these water faucets are on the outside of buildings, the faucets are exposed to the weather, and in particular to freezing temperatures. Protection from freezing is provided by wrapping the faucet or by putting a thermally insulated cover over the faucet.

The external faucets of a particular building may be used throughout winter. This is especially true in those geographical areas where freezing temperatures are intermittent. For example, a homeowner may wish to provide water to pets, plants, wash cars, etc.

Unwrapping and rewrapping faucets is time consuming and can be difficult in cold weather. Plastic foam covers have become popular because the covers can be installed and removed with somewhat greater ease.

Conventional plastic foam covers are coupled to the faucet by way of a metal hook. The hook hooks around the faucet and then extends out through a small hole in the cover. A wing nut on the outside end of the hook secures the hook and the cover in place. Other mechanisms for coupling for covers to faucets include rubber bands (see for example, Belgard, U.S. Pat. No. 4,456,027) and beaded chains (see for example, Hefner, U.S. Pat. No. 4,380,245).

These prior art covers are difficult to remove and reinstall onto the faucet. This is because the cover obscures the faucet from view. Any coupling to the faucet is done blindly. Once the hook is hooked onto the faucet, it must be pulled out away from the faucet to prevent the hook from slipping out of the faucet. While pulling, the wing nut or other locking mechanism must be tightened. This two-handed operation is very frustrating. This frustration in turn leads to the fact that once a cover is removed from a faucet, it is frequently left on the ground rather than be reattached to the faucet. Once off of the faucet, the cover is subject to damage from weather, children, or passers-by. Therefore, what is needed is an apparatus for simplifying the attachment of a cover to a faucet.

SUMMARY OF THE INVENTION

It is an object of the present invention to provide an apparatus for attaching a cover to a faucet in a simple and easy manner.

The present invention provides a cover for use in protecting faucets. The cover is thermally insulated and has a cavity that is structured and arranged to receive a faucet. The cover has a wall, with the wall having an opening therein. The wall has a first side and second side, with the first side being located in the cavity. There is a coupler having an anchor and a shank. The shank is received by the wall opening and extends out therefrom with the anchor located inside of the cavity. A stop is located on the shank at a position that is outside of the cavity. A spring is located on the shank so as to be interposed between the stop and the cover wall.

The present invention interposes a spring between the stop and the cover end wall. The spring allows an installer to move the hook closer to or further from the building wall without having to rotate or otherwise move the nut along the shank. The spring provides some resiliency to the stop, thereby making coupling and uncoupling of the cover to the faucet a much easier task to perform, even in cold weather.

In accordance with one aspect of the present invention, the position of the stop along the shank can be adjusted. For example, the shank is threaded and the stop comprises a nut.

In accordance with another aspect of the present invention, the spring is a helical coil spring.

In accordance with another aspect of the present invention, the spring is enclosed in a collapsible housing. The housing has first and second ends, with the first end abutting against the cover wall and the second end abutting against the stop.

In accordance with still another aspect of the present invention, the second end of the housing incorporates the stop.

DESCRIPTION OF THE PREFERRED EMBODIMENT

Figure 1:
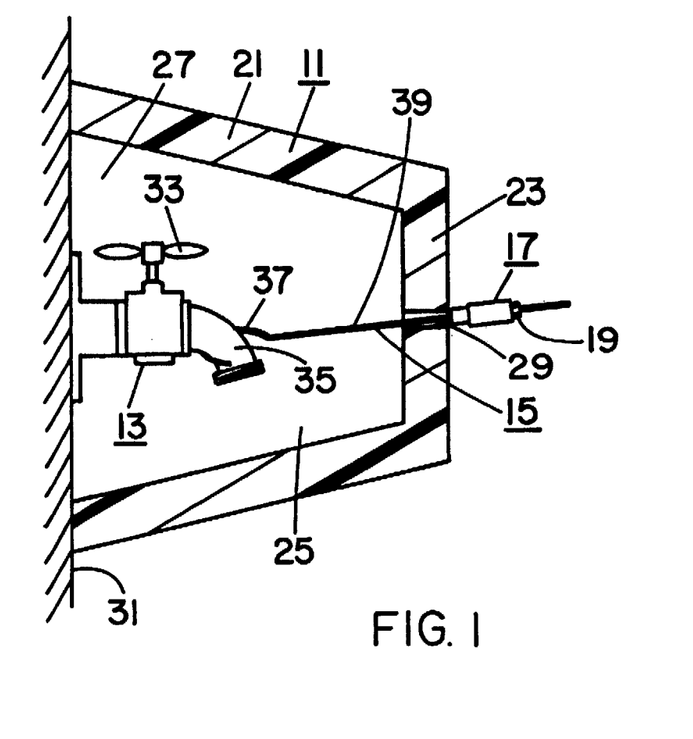
FIG. 1 is a schematic cross-sectional view of a cover around a faucet, which cover incorporates the apparatus of the present invention, in accordance with a preferred embodiment.

Referring to FIG. 1, the present invention is used to attach a cover 11 around a water faucet 13. The cover 11 is attached by way of a coupler 15.

The present invention includes a spring assembly 17 that is interposed between the cover 11 and a stop 19 on the coupler 15. The coupler 15 is pushed toward the faucet 13 in order to hook it around the faucet. When the coupler is released, the spring assembly 17 tightens the coupler on the faucet. With the present invention, the coupler 15 can be easily and quickly hooked onto the faucet 13 in order to couple the cover thereto.

The specifics of the present invention will now be discussed.

The cover 11 is conventional and commercially available. The cover 11 is dome shaped, having side walls 21 and an end wall 23. Inside of the cover is a cavity 25. Opposite the end wall 23 is an opening 27 for receiving the faucet 13 into the cavity 25. The end wall 23 has an opening 29 therethrough.

The cover 11 is made of rigid plastic foam, such as polystyrene. A rigid hard plastic layer can be provided around the outside of the foam for protection. Also, a flexible plastic foam can be provided around the edges of the side walls, in order to form a seal between the foam cover and the building wall.

The faucet 13 is a conventional water faucet mounted to a wall 31 of a building. The faucet 13 has a rotatable handle 33 to turn the flow water on and off. The faucet also has a spigot 35 for discharging water. The spigot 35 is typically pointed down towards the ground.

The coupler is typically a wire or rod and has a hook portion 37 and a shank portion 39. The shank portion 39 can be straight or slightly bent to position the hook towards the faucet. The shank portion 39 is typically threaded along its length. The hook portion 37 is designed to fit around either the spigot 35 or the handle 33 of the faucet.

Figure 2:
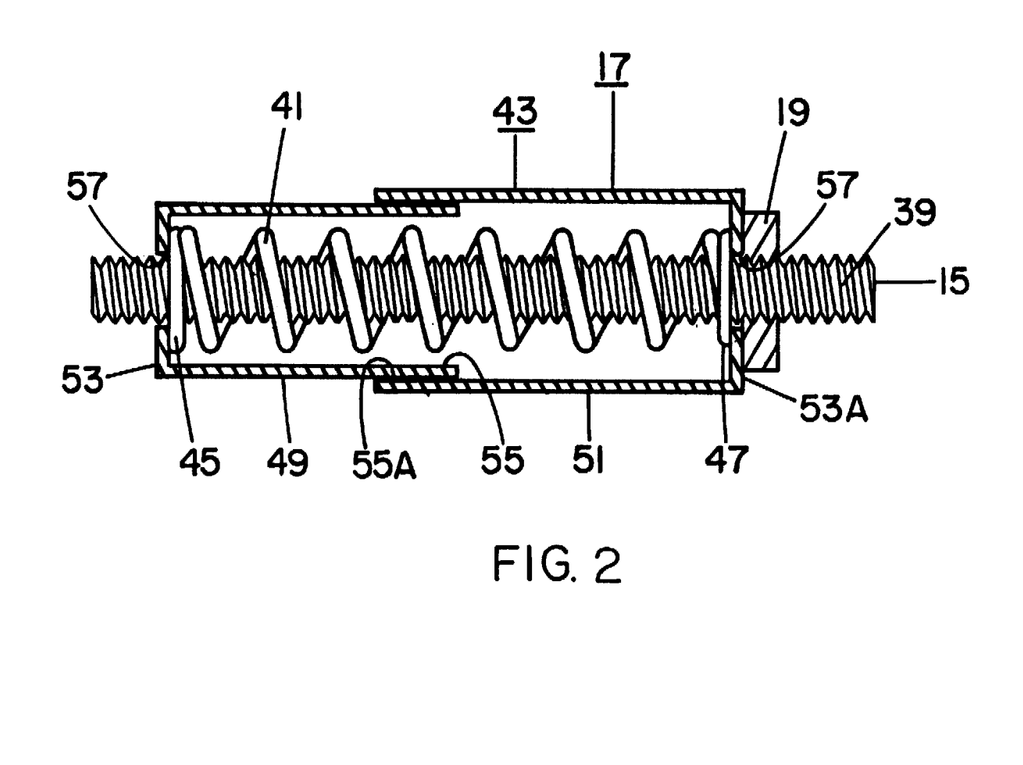
FIG. 2 is a schematic cross-sectional view of the apparatus.

The spring assembly 17 is shown in more detail in FIG. 2. The spring assembly 17 is located around the shank portion 39 of the coupler 15. The spring assembly 17 includes a spring 41 and a housing 43. The spring 41 is a helical coil spring having first and second ends 45,47.

In the preferred embodiment, the spring 41 is provided inside of the housing 43. The housing 43 has first and second portions 49, 51 each of which is a hollow tube. Each of the first and second portions has a closed end 53, 53A and an open end 55, 55A. One of the first and second portions 49 has a smaller outside diameter than the other of the first and second portions. This allows the portions 49, 51 to telescope relative to one another. The first and second portions are arranged such that the open end 55A of the larger of the first or second portions 51 receives the open end 55 of the smaller of the first or second portions 49. The closed ends 53, 53A are opposite of one another. Each closed end 53, 53A has a small opening 57 therein for allowing the coupler shank portion 39 to pass therethrough.

The spring 41 is located inside of the first and second portions 49, 51. The first end 45 of the spring is coupled to the inside of the closed end 53 of the first portion 49, while the second end 47 of the spring is coupled to the inside of the closed end 53A of the second portion 51. The spring can be coupled to the housing by adhesive, welding, etc.

When the two closed ends 53, 53A of the housing are forced together, the spring 41 compresses. When the closed ends of the housing are released, the spring pushes the closed ends back apart.

The spring assembly 17 is mounted onto the coupler 15 such that the shank portion 39 of the coupler 15 extends through the openings 57 of the housing and through the spring 41. One end of the spring assembly 17 abuts against a stop 19 that is coupled to the shank portion 39. The stop 19 resists movement along the length of the shank portion. In the preferred embodiment, the stop 19 is a nut that is threaded onto the shank portion. The nut 19 can be separate from the housing 43, or coupled thereto. The nut could be a hexagonal nut or a wing nut. If the shank portion is unthreaded, then the stop can be coupled thereto by adhesive, etc. The stop can be, for example, a clip or a sleeve with a set screw.

The assembly of the cover 11 and the coupler 15 will now be described. To assemble the spring assembly 17 onto the coupler 15, the shank portion 39 of the coupler is inserted into the cover cavity 25 by way of the large opening 27 (see FIG. 1). The shank portion 39 is then inserted through the opening 29 in the end wall 23 of the cover. The hook portion 37 is located inside of the cavity 25.

The spring assembly 17 is then inserted onto the shank portion 39 of the coupler. The nut 19 is then threaded onto the shank portion. The spring assembly 17 is now interposed between the end wall 23 of the cover and the nut 19. The closed end of the housing 43 that abuts against the cover 11 has a larger diameter than the opening 29 in the end wall 23.

Figure 3:
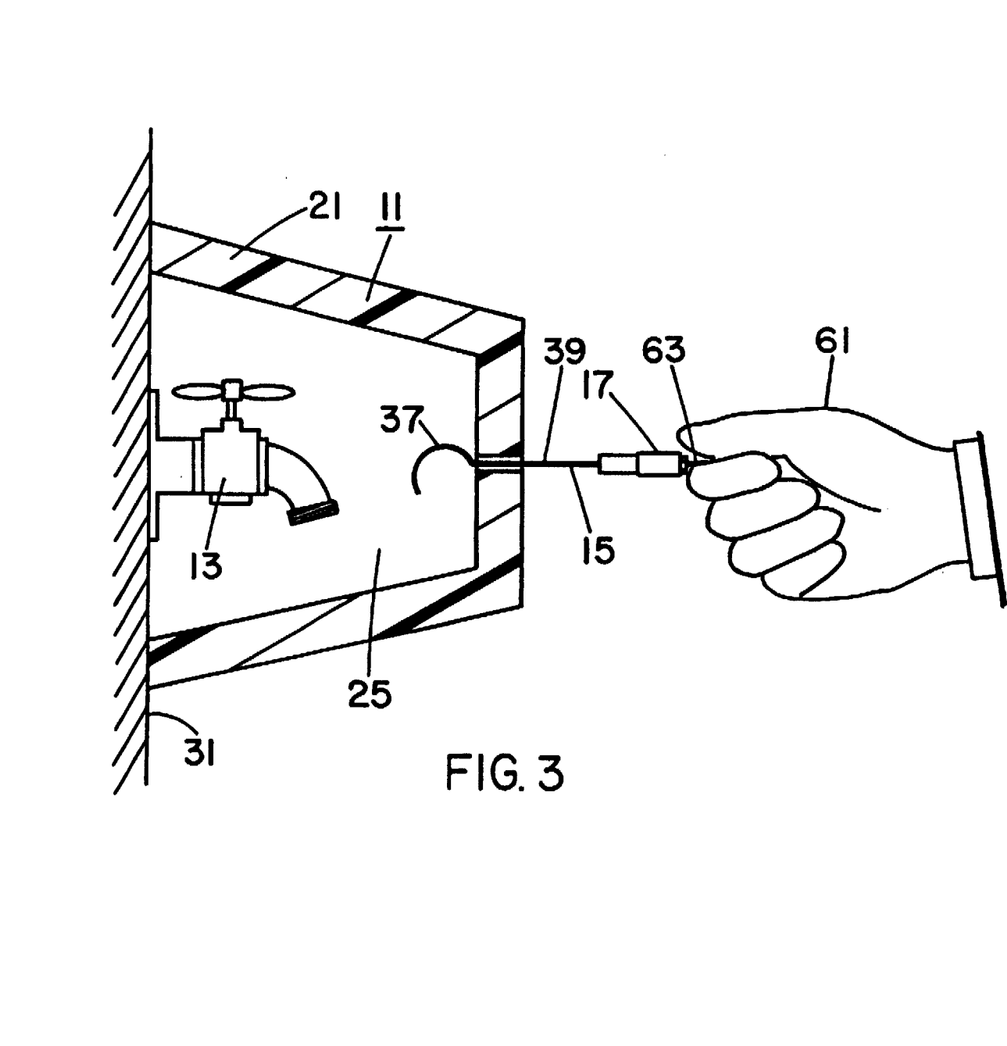
FIGS. 3–7 are schematic cross-sectional views illustrating the fastening of the cover to the faucet with the apparatus.

The installation of the cover 11 onto the faucet 13 will now be described with reference to FIGS. 3–7. The cover 11 is placed over the faucet 13 such that the faucet is located inside of the cavity 25 and the edges of the side walls 21 abut against the building wall 31, as shown in FIG. 3. The installer 61 grasps the free end 63 of the shank portion 39 of the coupler. The hook portion 37 can be aligned so as to point down, as shown in FIG. 3.

Figure 4:
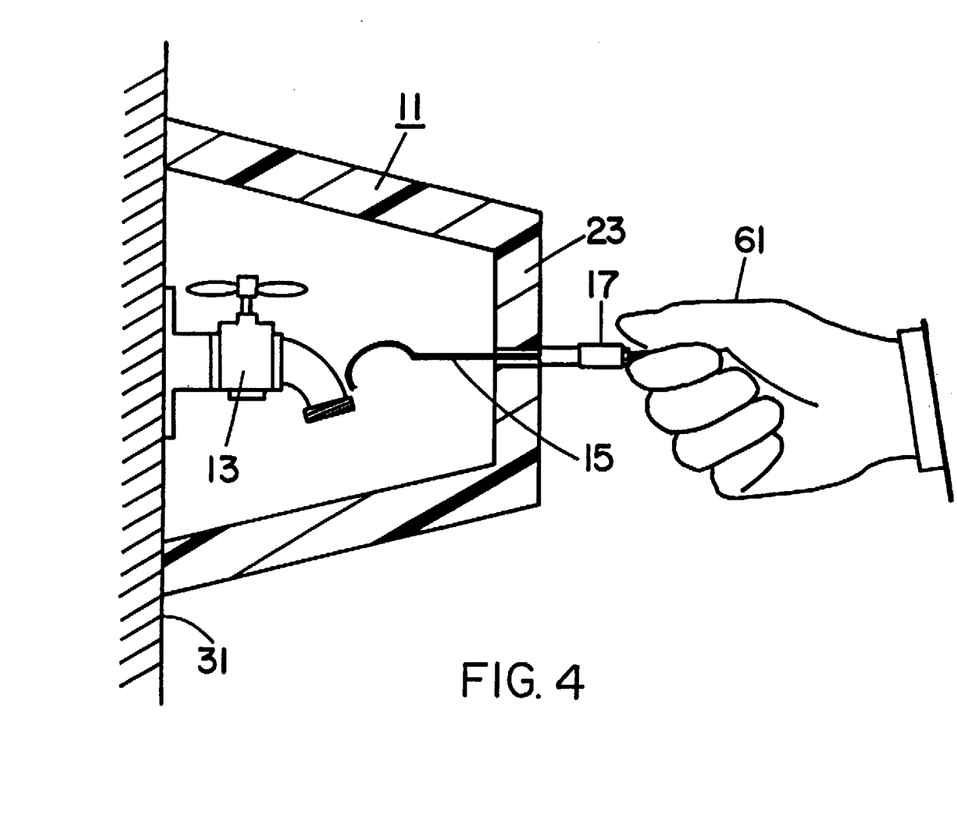
Figure 5:
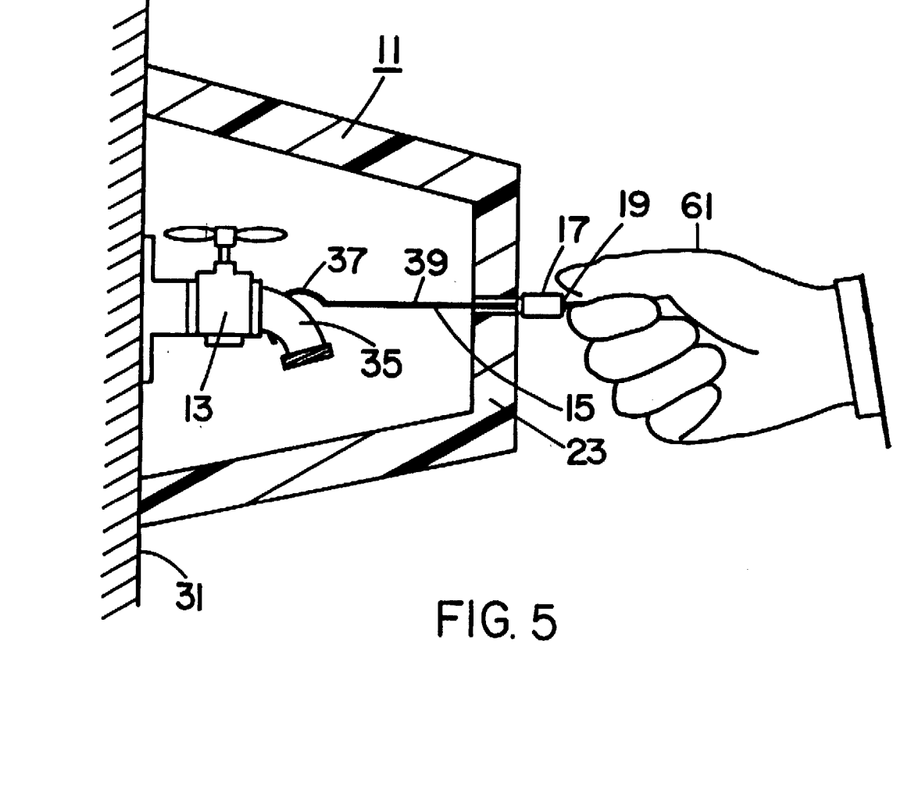
Figure 6:
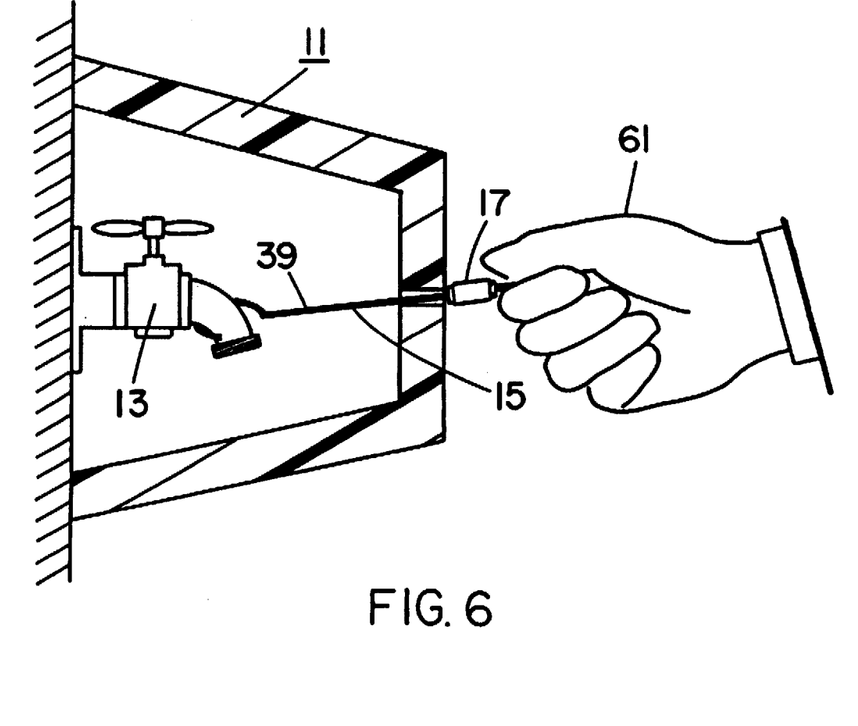
Figure 7:
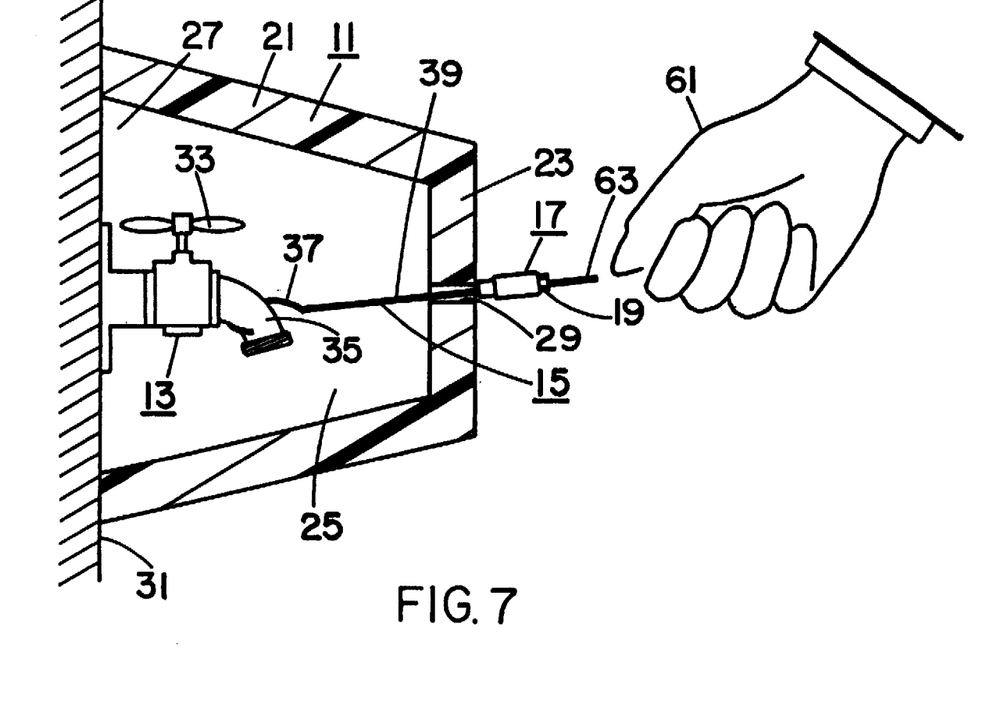

Then, the installer pushes the coupler 15 in towards the faucet 13 until the spring assembly 17 contacts the cover end wall 23, as shown in FIG. 4. The installer continues pushing the coupler 15 in, so as to compress the spring assembly 17 between the end wall 23 and the nut 19, as shown in FIG. 5. This action allows the hook portion 37 to extend the proper distance into the cavity so as to hook onto the spigot 35. The installer rotates the shank portion 39 to capture the spigot 35 in the hook portion 37, as shown in FIG. 6. Once the spigot is hooked, the installer releases the coupler, wherein the spring assembly 17 pushes against the nut 19, and thereby pushes the coupler out slightly, away from the building wall 31. This further engages the spigot 35 with the hook portion 37, as shown in FIG. 7. The cover 11 is now coupled to the faucet 13. The spring assembly 17 is shown compressed in FIGS. 5 and 6, and is shown uncompressed in FIGS. 3, 4, and 7.

The tension exerted by the spring assembly 17 can be adjusted by moving the stop or nut 19 relative to the end wall 23 of the cover. To more firmly couple the cover to the faucet, the nut is moved closer to the end wall. This compresses the spring, which in turn exerts more force on the nut, thereby causing the coupler to pull harder against the faucet. Moving the nut further from the end wall has the opposite effect. In general, the spring should be compressed somewhat, but preferably not beyond 50% of its compression potential. This allows some resiliency in the coupler, which is desirable for removing the coupler and the cover from the faucet.

To remove the coupler and the cover, the end 63 (see FIG. 7) of the shank portion is grasped and the coupler 15 is pushed in towards the faucet 13. This compresses the spring assembly 17, which in turn allows the hook portion 37 to be pushed in closer to the building wall 31. The coupler can then be uncoupled or unhooked from the spigot by rotating the coupler.

A conventional cover is retained on the faucet by being clamped between the building wall and the nut. The nut is threaded onto the shank portion until the nut contacts the end wall of the cover. In order to remove the cover, the nut must be unthreaded, a difficult task to perform in cold weather. The present invention interposes a spring between the nut or stop and the cover end wall. The spring allows the installer to move the hook closer to or further from the building wall without having to rotate or otherwise move the nut. The spring provides some resiliency to the stop, thereby making coupling and uncoupling to the faucet a much easier task to perform.

Thus, the present invention allows the cover to be installed or removed merely by pushing in the coupler and slightly rotating the coupler. Because this operation is easy and fast to perform, even in cold weather, a cover equipped with the present invention is more likely to be removed and replaced onto a faucet, rather than left lying on the ground unused.

The spring assembly 17 can be retrofitted onto existing covers and couplers.

The closed end 53 of the housing 43 acts like a washer to distribute the force of the spring against the cover 11. A larger washer can be utilized if necessary.

The free end 63 of the shank portion can be equipped with a knob to make grasping the free end with a hand easier.

The housing 43 for the spring can incorporate the stop. For example, referring to FIG. 2, the closed end 53A of the second portion 51 can have its opening 57 threaded. The outer circumference of the second portion 51 can be knurled or hexagonal shape to allow ease of gripping and rotating the first portion.

Although the spring assembly has been described as having a housing, a housing is not required.

Although the coupler has been described as having a hook 37, the coupler can be anchored to the faucet by various other mechanisms. For example, the coupler can have a loop for fastening to the faucet.

The forgoing disclosure and the showings made in the drawings are merely illustrative of the principles of this invention and are not to be interpreted in a limiting sense.

I claim:

1. In a cover for use in protecting faucets, the cover being thermally insulated and having a cavity that is structured and arranged to receive a faucet, the cover having a wall, the wall having an opening therein, the wall having a first side and a second side, with the first side being located in the cavity, comprising:
    a) a coupler having an anchor and a shank, the shank being received by the wall opening and extending out therefrom with the anchor located inside of the cavity;
    b) a stop located on the shank at a position that is outside of the cavity; and
    c) a spring located on the shank so as to be interposed between the stop and the cover wall.

2. The cover of claim 1 wherein the position of the stop along the shank can be adjusted.

3. The cover of claim 1 wherein the shank is threaded and the stop comprises a nut.

4. The cover of claim 1 wherein the spring is a helical coil spring.

5. The cover of claim 1 further comprising a collapsible housing containing the spring, the housing having first and second ends, with the first end abutting against the cover wall and with the second end abutting against the stop.

6. The cover of claim 5 wherein the second end of the housing incorporates the stop.

7. The cover of claim 1 wherein:
    a) the shank is threaded and the stop comprises a nut;
    b) the spring is a helical coil spring;
    c) a collapsible housing contains the spring, the housing having first and second ends, with the first end abutting against the cover wall and with the second end abutting against the stop; and
    d) the second end of the housing incorporates the stop.

8. A plumbing installation, comprising:
    a) a structure wall;
    b) a faucet projecting from the structure wall;
    c) a cover having a cover wall that forms a cavity, the cover having an open end that allows communication with the cavity and a closed end, the cover wall being thermally insulated and having an opening in the closed end;
    d) the cover being located against the wall so that the open end abuts the wall and the faucet is received in the cavity;
    e) a coupler having a hook that is located around a portion of the faucet and a shank that extends from the hook and through the cover wall opening;
    f) a stop located on the shank at a position outside of the cavity;
    g) a spring located on the shank and interposed between the stop and the cover wall.

9. The installation of claim 8, wherein:
    a) the shank is threaded and the stop comprises a nut;
    b) the spring is a helical coil spring;
    c) a collapsible housing contains the spring, the housing having first and second ends, with the first end abutting against the cover wall and with the second end abutting against the stop; and
    d) the second end of the housing incorporates the stop.

* * * * *